Patented Mar. 1, 1932

1,847,111

UNITED STATES PATENT OFFICE

ALBERT H. HOOKER, OF LEWISTON, NEW YORK, ASSIGNOR TO HOOKER ELECTROCHEMICAL COMPANY, OF NIAGARA FALLS, NEW YORK, A CORPORATION OF NEW YORK

PROCESS OF MAKING CELLULOSIC PRODUCTS

No Drawing. Application filed April 8, 1929. Serial No. 353,669.

The object of this invention is to provide a novel and economical process for the preparation, from wood, of a plurality of commercially valuable products, to wit, soda pulp and so-called "high alpha cellulose", this latter being a product containing about 94% or upward of the more resistant (alkali-insoluble) cellulosic component of wood, and useful for the manufacture of rayon as well as for certain high grades of paper.

Each of the above mentioned cellulose products is now prepared by special and individual treatments of the appropriate cellulosic raw materials with solutions of caustic soda: and one object of the present invention is to provide a balanced process whereby both of the above products may be made in the course of a single manufacturing operation having cyclical characteristics. Thereby I am enabled to cheapen largely the operating costs as well as to effect certain improvements in the process.

In a typical operation according to this invention the manufacture of the high alpha cellulose is carried out by subjecting sulphite pulp, or equivalent pulp otherwise prepared, to the solvent and purifying action of a large volume of relatively dilute caustic soda solution. This type of operation is well understood and need not be described further than to say that various concentrations of caustic soda solution may be used, up to about 10 or 12% NaOH, the temperature and time of treatment being controlled to secure the desired degree of purification with the particular concentration chosen. With highly dilute solutions, say around two or three percent, the digestion is preferably carried out in an autoclave under pressure in order to secure the desired temperature. Whatever may be the specific conditions chosen for this treatment the result is a cellulose product containing about 94% or upward of alpha cellulose, and an effluent liquor containing most of the original caustic but contaminated by the impurities dissolved out of the sulphite cellulose and likewise somewhat diluted by the water carried by the sulphite cellulose, assuming this latter to have been employed in the condition of unbleached or only lightly bleached dewatered stock containing about 20 to 25% fiber.

It will be understood that this high alpha cellulose is, commercially speaking, a high grade and relatively pure product, capable of being utilized without further purification in the manufacture of viscose, etc. Accordingly it can be prepared in satisfactory quality only by the treatment of sulphite or equivalent fiber of special grade with commercially pure caustic soda solutions. Consequently the use of impure caustic, or the reuse of caustic until the dissolved impurities derived from the wood mount to a considerable percentage, is excluded. For this reason the effluent liquor from the alpha cellulose operation is not available for re-use, or repeated re-use, without purification involving an expensive regenerative operation.

On the other hand, I have observed that this effluent liquor containing about 8%, more or less, of NaOH, and containing also soluble cellulose products derived from the preparation of high alpha cellulose as described above, is practically equally effective as a pure caustic soda solution of like strength for the special purpose of the preparation of soda pulp from wood fiber.

This latter process, as commonly practiced, involves the treatment of wood with a caustic soda solution of around 8% concentration, with the production of an effluent which is highly contaminated or substantially exhausted, this effluent being thereafter regenerated by the well known black ash process. This latter operation yields a purified caustic soda of around 9% concentration, and excellently adapted for the preparation of high alpha cellulose from sulphite fiber as described above. Therefore my invention contemplates a cycle including the delivery of the contaminated caustic solution from the alpha cellulose operation (with such reinforcement as may be desirable or necessary) to the soda pulp plant; its use therein for the manufacture of soda pulp; its purification by the black ash or equivalent process; and its re-use in the high alpha cellulose process, thus completing the cycle. Great advantages inherent in this cycle will be apparent from the foregoing, inasmuch as a single purification and regeneration (for instance by the black ash process) suffices for the two processes (the high alpha cellulose process and the soda pulp process) instead of a separate purification being required for each as has heretofore always been the case.

Assuming a substantial dilution of the caustic solution in the course of the high alpha cellulose operation, such as will occur when sulphite pulp of around 25% fiber is used, an evaporative step may be interposed between this operation and the soda pulp operation to restore the desired concentration—for instance to raise the concentration from 7% to 8 or 9%. On the other hand, the soda pulp plant requires for its operation the daily addition of a quantity of caustic soda approximately equivalent to 10% of the entire quantity of caustic in circulation: or in other words a soda plant utilizing 65 tons of caustic soda in solution will require a daily addition of about 6.5 tons to compensate for losses. If this be added as a 9% solution derived from a soda ash causticizing operation evaporation will be necessary to restore the operating concentration. On the other hand it is highly advantageous to introduce this caustic either as solid (electrolytic) caustic soda, or preferably as the so-called liquid caustic of commerce of about 47% concentration. By doing so the concentration of the circulating liquors can be increased to the desired degree without the necessity of evaporation.

My process will thus be seen to be essentially cyclical in character involving the preparation of two distinct commercial cellulose products in a single operating cycle, with regeneration and restoration of the circulating liquid in such manner as to maintain continuity of operation and a balance of operating conditions.

I claim:

1. In a cyclical process of making cellulosic products, the steps of converting sulphite fiber into high alpha cellulose by treatment with dilute caustic soda solution, restoring the concentration of the effluent liquor, utilizing the same for the conversion of wood fiber into soda pulp, purifying and regenerating the effluent from the soda pulp operation, utilizing the purified liquid for the production of high alpha cellulose, and repeating the cycle.

2. In a cyclical process of making cellulosic products, the steps of converting sulphite fiber into high alpha cellulose by treatment with dilute caustic soda solution, reinforcing the effluent liquor and restoring its concentration by adding thereto caustic soda, utilizing the same for the conversion of wood fiber into soda pulp, purifying and regenerating the effluent from the soda pulp operation, utilizing the purified liquid for the production of high alpha cellulose, and repeating the cycle.

In testimony whereof, I affix my signature.

ALBERT H. HOOKER.